United States Patent [19]
Huang et al.

[11] Patent Number: 6,133,668
[45] Date of Patent: Oct. 17, 2000

[54] ROTOR STRUCTURE FOR A MOTOR

[76] Inventors: Ying-Chih Huang, Floor 10, No. 19, Lane 695, Chung-Cheng Rd., Feng-Yuan City, Taichung; Chien-Nan Huang, No. 11, Nong 40, Lane 27, Sec. 6, Fu-An Rd., Tainan, both of Taiwan

[21] Appl. No.: 09/431,114

[22] Filed: Nov. 1, 1999

[51] Int. Cl.[7] .................................................. H02K 1/22
[52] U.S. Cl. ..................... 310/261; 310/263; 310/264; 29/598
[58] Field of Search .................................. 310/261, 270, 310/269, 194, 263, 264; 29/598, 609

[56] References Cited

U.S. PATENT DOCUMENTS

| | | | |
|---|---|---|---|
| 2,445,986 | 7/1948 | Adamson | 310/42 |
| 3,214,621 | 10/1965 | Quear et al. | 310/215 |
| 3,831,268 | 8/1974 | Boyd et al. | 29/598 |
| 3,882,336 | 5/1975 | Boyd et al. | 310/216 |
| 4,028,573 | 6/1977 | Terrone | 310/217 |
| 4,063,123 | 12/1977 | Herr et al. | 310/270 |
| 4,490,638 | 12/1984 | Lind | 310/269 |
| 5,449,963 | 9/1995 | Mok | 310/270 |

*Primary Examiner*—Nestor Ramirez
*Assistant Examiner*—Joseph Waks
*Attorney, Agent, or Firm*—Charles E. Baxley

[57] ABSTRACT

A rotor structure for a motor includes a rotor body having two sides, two sun plates each attached to one of the two sides of the rotor body and each having a copper wire wound thereon, and two end caps each secured to a corresponding one of the two sun plates and each enclosing the copper wire therein. Each of the two end caps includes a plurality of plugs each inserted into the respective sun plate for securing the end cap to the respective sun plate.

8 Claims, 7 Drawing Sheets

ROTOR STRUCTURE FOR A MOTOR

BACKGROUND OF THE INVENTION

1. Field of the Invention

The present invention relates to a rotor structure, and more particularly to a rotor structure for a motor.

2. Description of the Related Prior Art

A conventional motor rotor structure shown in FIG. 1 comprises a plurality of silicon steel pieces 15, two sun plates 11, a plurality of insulating pieces 14 each securely attached to each of the two sun plates 11, a plurality of copper wires 10 each wound around each of the two sun plates 11, a binding wire 12 for binding the copper wires 10, and an epoxy layer 13 coated on the periphery of the copper wires 10 and the binding wire 12 for securely attached the copper wires 10 to the sun plates 11 and the body of the motor rotor structure.

However, the epoxy lay 13 is toxic so that it easily injures the workmen and causes an environmental pollution. In addition, the epoxy layer 13 has a high price, thereby increasing the cost of the motor rotor structure. Secondly, the insulating pieces 14 are in turn securely attached to the sun plates 11, thereby increasing the working time and complicating the manufacturing process of the motor rotor structure. Thirdly, when the motor rotor structure has been assembled, it is necessary to cut part of the silicon steel pieces 15 so as to adjust and calibrate the center of gravity of the motor rotor structure when performing the rotor balance, thereby greatly increasing the working time and complicating the manufacturing process of the motor rotor structure. In addition, cutting the silicon steel pieces 15 that are expensive will cause a cost consumption of making the motor rotor structure.

SUMMARY OF THE INVENTION

The primary objective of the present invention is to provide a motor rotor structure comprising a rotor body having two sides, two sun plates each attached to one of the two sides of the rotor body and each having a copper wire wound thereon, two end caps each secured to a corresponding one of the two sun plates and each enclosing the copper wire therein, and two C-shaped clamping members each secured on a corresponding one of the two end caps.

Each of the two end caps includes a plurality of plugs each inserted into the respective sun plate for securing the end cap to the respective sun plate. Each of the two end caps includes a first cap body and a second cap body coupled with each other, each of the cap body and the second cap body has two sides each including a snapping member coupled with each other. Each of the two end caps has an outer periphery including a plurality of helically arranged guiding ribs protruding outward. Each of the two end caps has a plurality of vent holes each defined therethrough. Each of the two end caps includes a plurality of receiving recesses each defined in the outer periphery thereof, and the rotor structure comprises a plurality of counterweights each received in a corresponding one of the receiving recesses.

Further objectives and advantages of the present invention will become apparent after a complete reading of the detailed description with reference to the accompanying drawings.

DETAILED DESCRIPTION OF THE PREFERRED EMBODIMENTS

Figure 1:
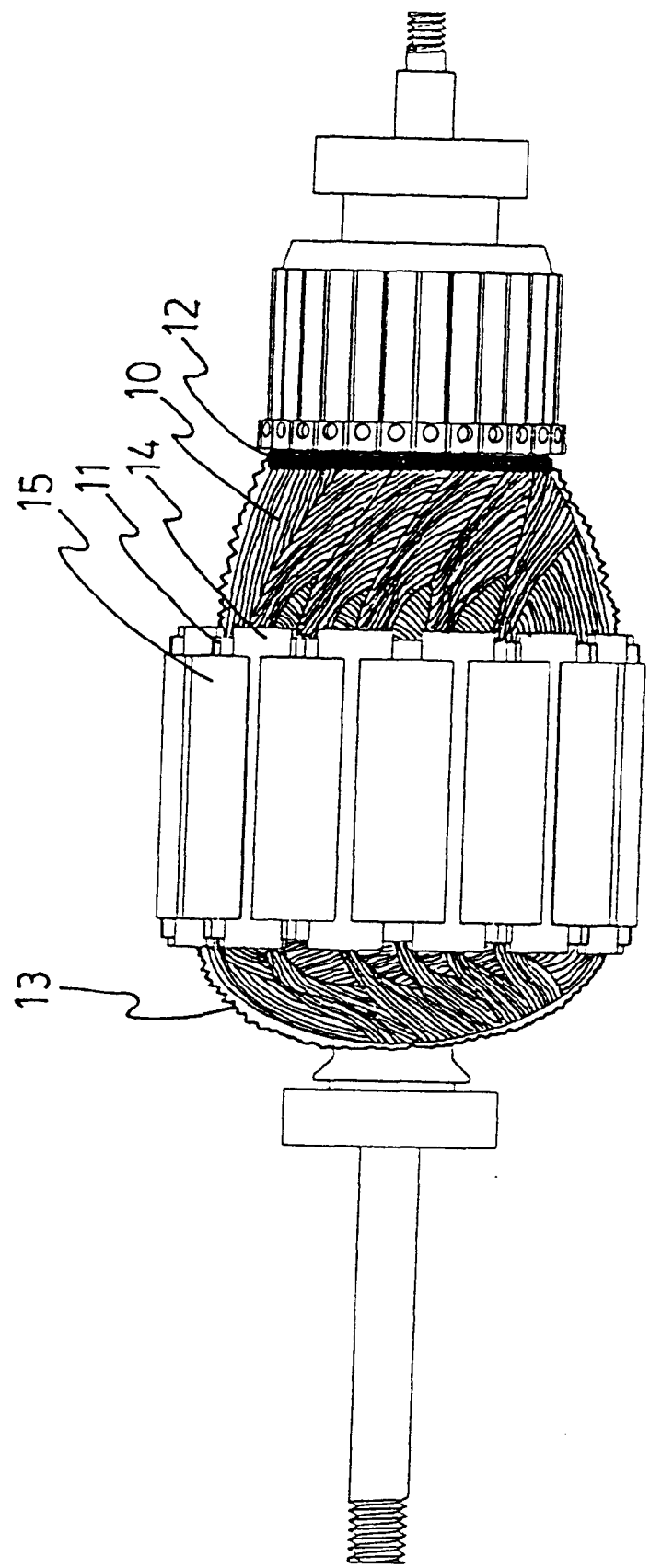
FIG. 1 is a front plan view of a conventional motor rotor structure according to the prior art.
Figure 2:
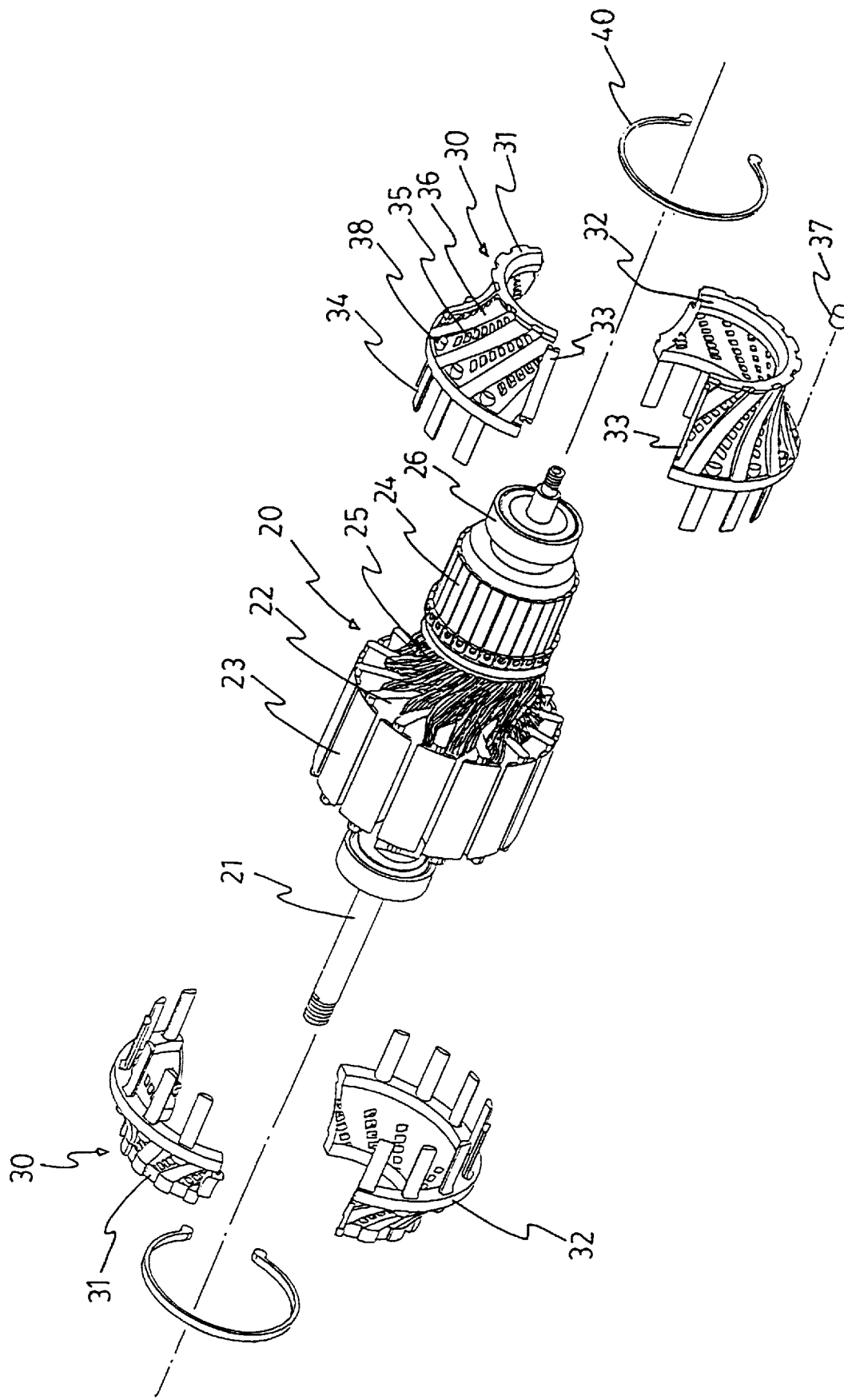
FIG. 2 is an exploded view of a rotor structure for a motor according to the present invention.
Figure 3:
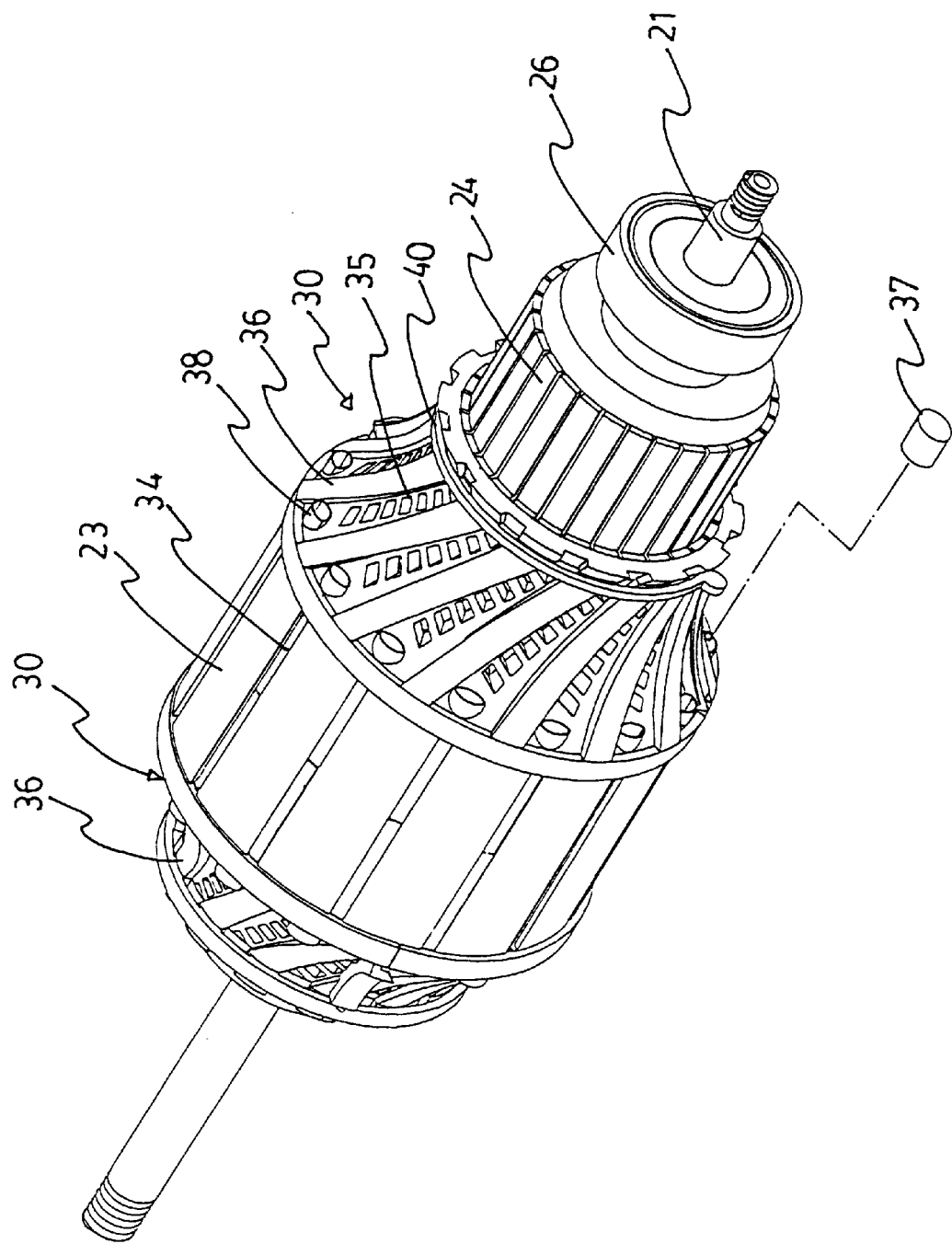
FIG. 3 is a perspective assembly view of the rotor structure as shown in FIG. 2.
Figure 4:
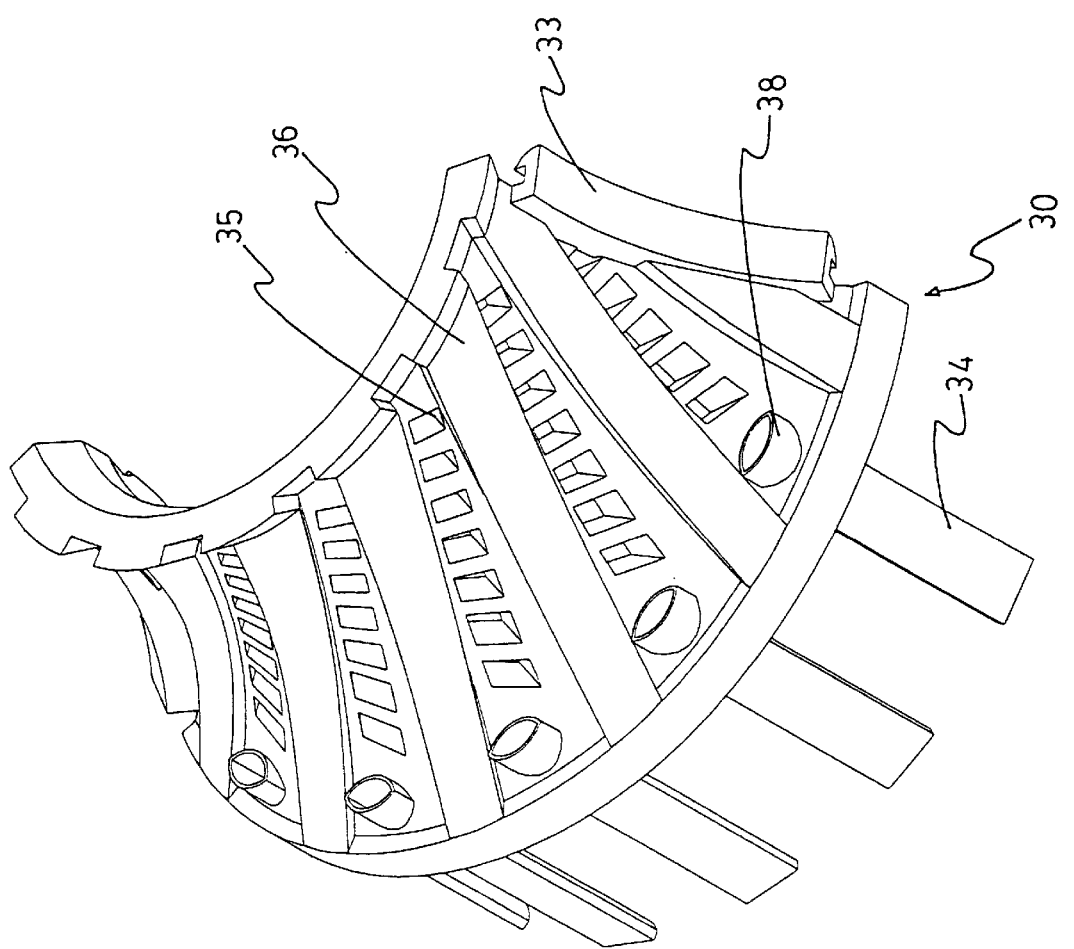
FIG. 4 is a perspective view of an end cap of the rotor structure as shown in FIG. 2.
Figure 5:
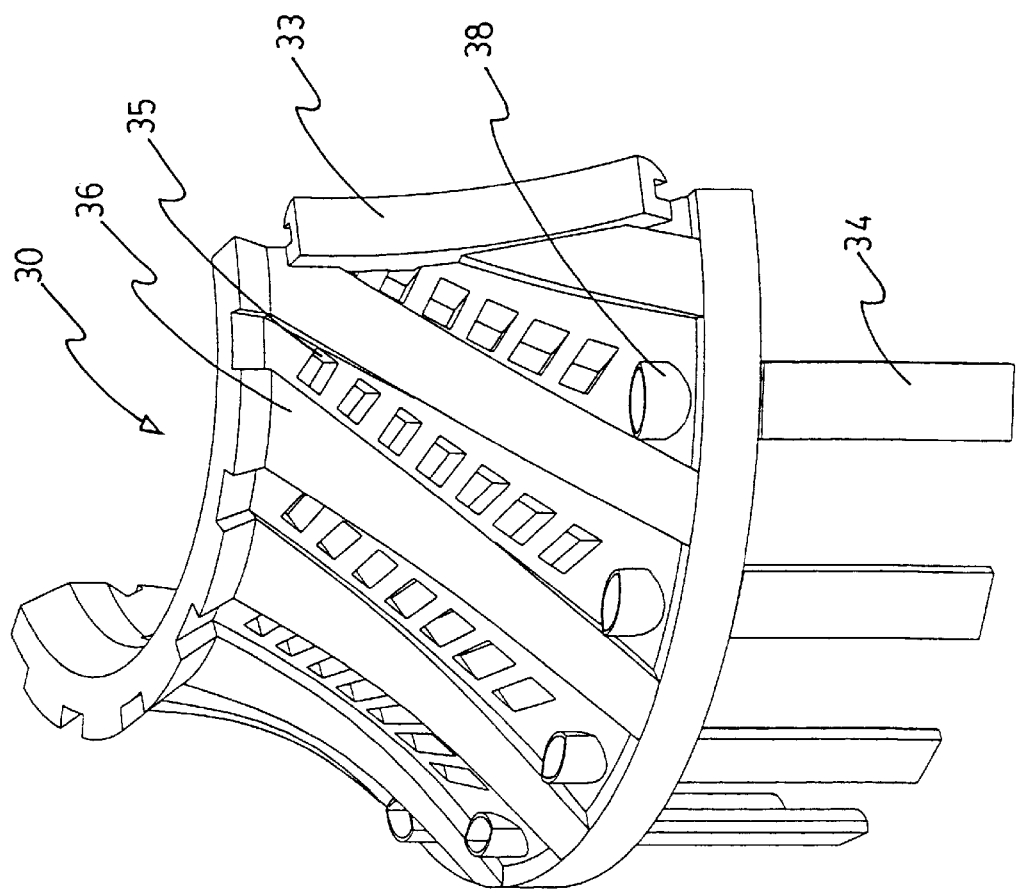
FIG. 5 is a perspective view of an end cap of the rotor structure as shown in FIG. 2.
Figure 6:
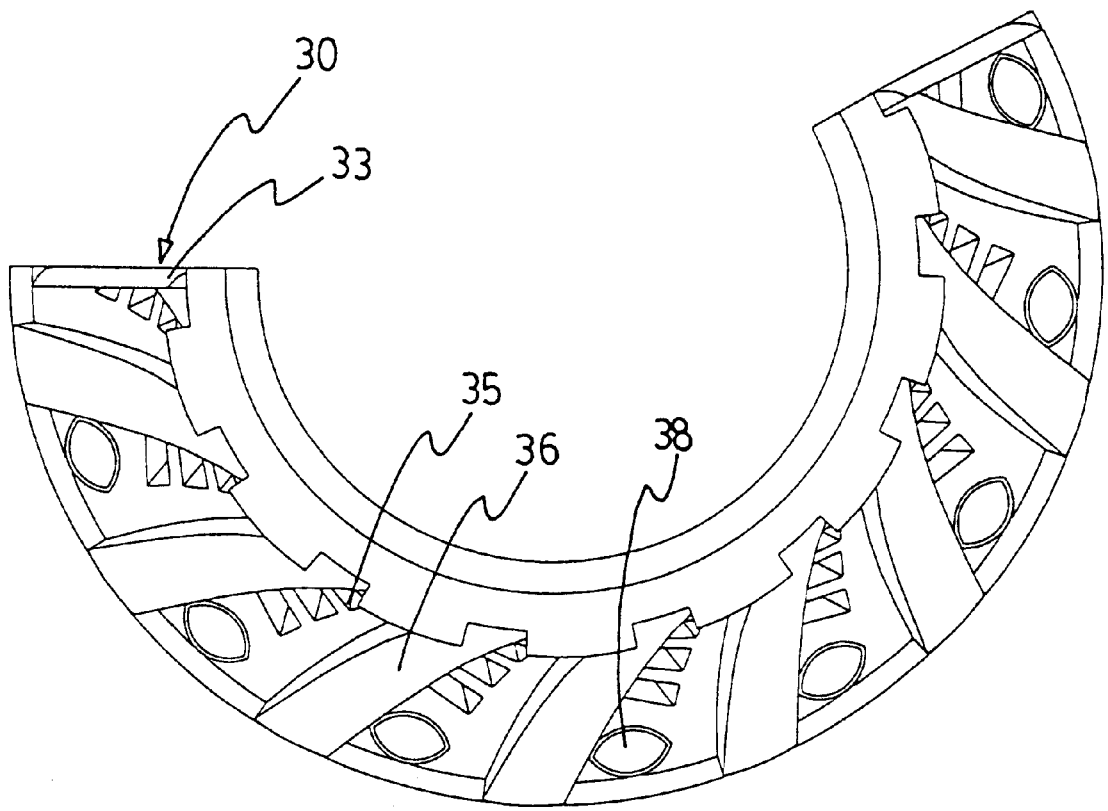
FIG. 6 is a side view of an end cap of the rotor structure as shown in FIG. 2.
Figure 7:
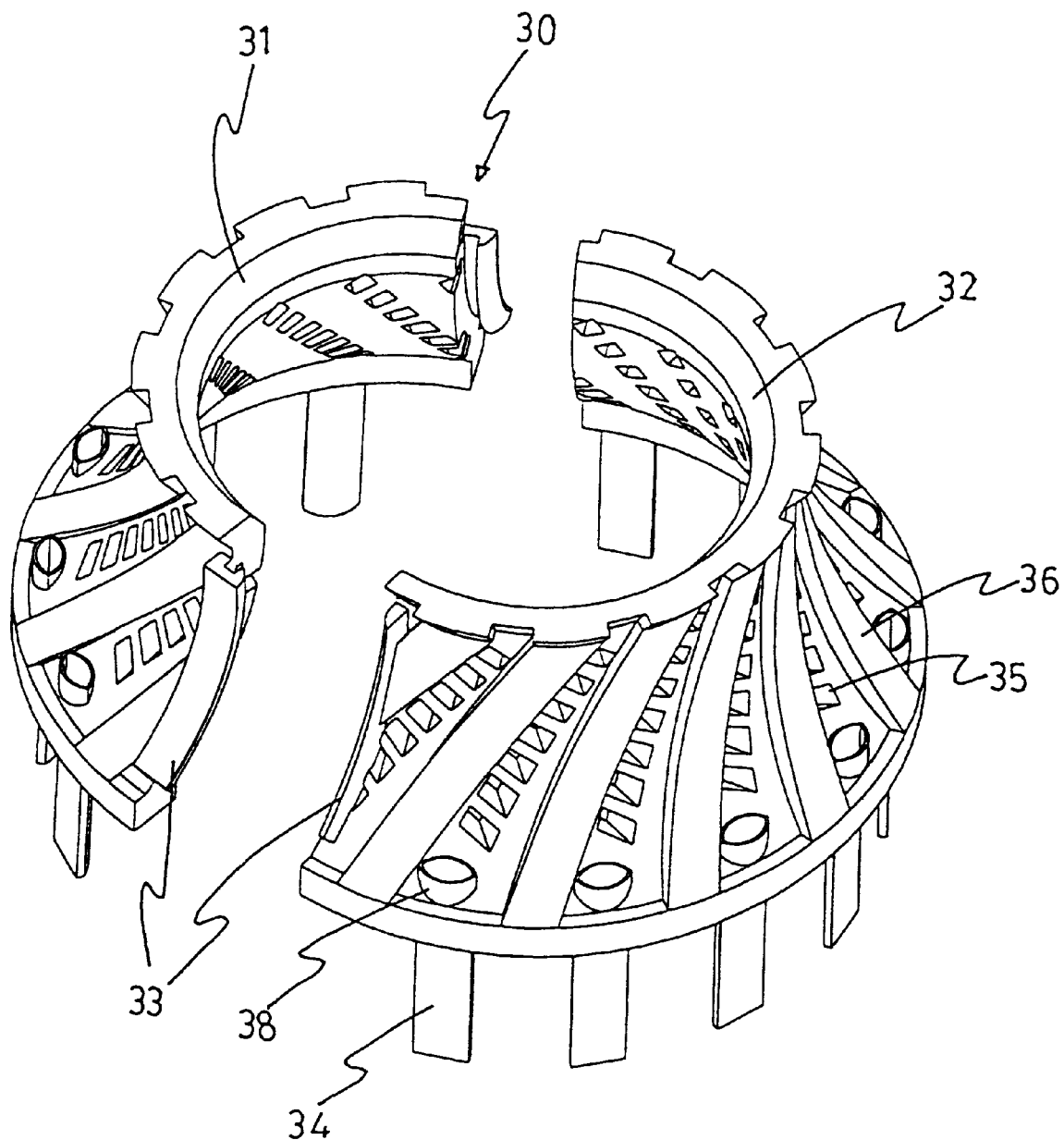
FIG. 7 is an exploded view of the two end caps of the rotor structure as shown in FIG. 2.

With reference to FIGS. 2–7, a rotor structure for a motor according to the present invention comprises a rotor body 20 including a shaft 21, a plurality of silicon steel pieces 23, two sun plates 22, a plurality of copper wires 25, a rectifier 24, and two bearings 26. The above structure is conventional, and will not be further described in detail.

Two end caps 30 each are secured to a corresponding one of the two sun plates 22 for enclosing the copper wires 25 therein, and each include a plurality of plugs 34 each respectively inserted into the respective sun plate 22 for securing the end cap 30 to the respective sun plate 22, thereby firmly securing the copper wires 25 in the end caps 30. Accordingly, the end caps 30 can be used to replace the conventional epoxy layer 13 and the plurality of insulating pieces 14.

Each of the two end caps 30 has an arcuate inner periphery and includes a first cap body 31 and a second cap body 32 coupled with each other. Each of the cap body 31 and the second cap body 32 has two sides each including a snapping member 33 coupled with each other. The rotor structure further comprises two C-shaped clamping members 40 each secured on a corresponding one of the two end caps 30 for coupling the first cap body 31 and the second cap body 32 together.

Each of the two end caps 30 has an outer periphery including a plurality of helically arranged guiding ribs 36 protruding outward for guiding the air flow when the rotor structure is rotated, and a plurality of inclined vent holes 35 each located between two adjacent guiding ribs 36 for circulating the air current therethrough so as to guide the air flow into the end caps 30 for cooling the copper wires 25.

Each of the two end caps 30 has a plurality of receiving recesses 38 defined in the outer periphery thereof, and the rotor structure comprises a plurality of counterweights 37 each received in a corresponding one of the receiving recesses 38. Accordingly, some of the counterweights 37 can be directly removed from the respective receiving recesses 38 so as to adjust the center of gravity of the rotor structure when performing the rotor balance, without a need to cut the silicon steel pieces 23, thereby simplifying the manufacturing process and preventing consuming the expensive silicon steel pieces 23.

Although the present invention has been described with a certain degree of particularity, it is to be understood that the present disclose has been made by way of example only and that many other possible modifications and variations can be made without departing from the scope of the present invention.

What is claimed is:

1. A rotor structure for a motor comprising:

a rotor body (20) having two sides;

two sun plates (22) each attached to one of said two sides of said rotor body (20) and each having a copper wire (25) wound thereon; and two end caps (30) each secured to a corresponding one of said two sun plates (22) and each enclosing said copper wire (25) therein, each of said two end caps (30) including a plurality of plugs (34) each inserted into said respective sun plate (22) for securing said end cap (30) to said respective sun plate (22).

2. The rotor structure as claimed in claim 1, wherein each of said two end caps (30) includes a first cap body (31) and a second cap body (32) coupled with each other, each of said cap body (31) and said second cap body (32) has two sides each including a snapping member (33) coupled with each other.

3. The rotor structure as claimed in claim 1, wherein each of said two end caps (30) has an outer periphery including a plurality of guiding ribs (36) protruding outward.

4. The rotor structure as claimed in claim 3, wherein each of guiding ribs (36) are helically arranged.

5. The rotor structure as claimed in claim 1, wherein each of said two end caps (30) has a plurality of vent holes (35) each defined therethrough.

6. The rotor structure as claimed in claim 1, wherein each of said two end caps (30) has an outer periphery including a plurality of receiving recesses (38) defined therein, and said rotor structure further comprises a plurality of counterweights (37) each received in a corresponding one of said receiving recesses (38).

7. The rotor structure as claimed in claim 1, further comprising two clamping members (40) each secured on a corresponding one of said two end caps (30).

8. The rotor structure as claimed in claim 7, wherein each of said two clamping members (40) is C-shaped.

* * * * *